United States Patent
Chavez et al.

(10) Patent No.: US 11,757,531 B1
(45) Date of Patent: Sep. 12, 2023

(54) SYSTEMS AND METHODS FOR PREVENTING LIGHTBEAM ACCESS TO MICROPHONES OF SMART DEVICES

(71) Applicant: United Services Automobile Association (USAA), San Antonio, TX (US)

(72) Inventors: Carlos J P Chavez, San Antonio, TX (US); Sacha Melquiades De'Angeli, San Antonio, TX (US); Oscar Guerra, San Antonio, TX (US); David M. Jones, Jr., San Antonio, TX (US); Gregory Brian Meyer, San Antonio, TX (US); Christopher Russell, The Colony, TX (US); Arthur Quentin Smith, Fredericksburg, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 251 days.

(21) Appl. No.: 17/003,726

(22) Filed: Aug. 26, 2020

(51) Int. Cl.
| | |
|---|---|
| *H04B 10/116* | (2013.01) |
| *H04K 3/00* | (2006.01) |
| *G06F 21/43* | (2013.01) |
| *H04B 10/85* | (2013.01) |
| *G06F 21/55* | (2013.01) |

(52) U.S. Cl.
CPC ........... *H04B 10/116* (2013.01); *G06F 21/43* (2013.01); *G06F 21/554* (2013.01); *H04B 10/85* (2013.01); *H04K 3/822* (2013.01); *H04K 3/825* (2013.01); *H04K 3/88* (2013.01)

(58) Field of Classification Search
CPC ....... H04B 10/116; H04B 10/85; G06F 21/43; G06F 21/554; H04K 3/822; H04K 3/825; H04K 3/88
See application file for complete search history.

(56) References Cited

U.S. PATENT DOCUMENTS

| | | | |
|---|---|---|---|
| 2019/0043471 A1* | 2/2019 | Maziewski | H04K 3/00 |
| 2020/0243067 A1* | 7/2020 | Maziewski | G06F 21/566 |

(Continued)

FOREIGN PATENT DOCUMENTS

WO   WO-2021211127 A1 * 10/2021

OTHER PUBLICATIONS

Sugawara, Takeshi et al.; "Light Commands: Laser-Based Audio Injection Attacks on Voice-Controllable Systems" Nov. 4, 2019.

*Primary Examiner* — Leslie C Pascal
(74) *Attorney, Agent, or Firm* — Fletcher Yoder, P.C.

(57) ABSTRACT

The present disclosure relates to preventing laser access to microphones of smart devices. In one embodiment, a microphone of the smart device may be covered with an opaque material such as a cloth cover. The opaque material may serve as a barrier that is impenetrable to light, thereby preventing laser light to reach the microphone. In a further embodiment, a smart device may prevent the one or more microphones of the smart device from receiving an audio command embedded in a light signal by disrupting the light signal, ignoring the audio command, or both. In another embodiment, the smart device may block the audio command from being received at a microphone of a smart device by determining a frequency of the light signal, instructing a laser jammer to transmit a counter light with the frequency to interfere with the light signal.

20 Claims, 3 Drawing Sheets

(56) References Cited

U.S. PATENT DOCUMENTS

| | | | |
|---|---|---|---|
| 2020/0260186 A1* | 8/2020 | Stachura | H04K 3/46 |
| 2020/0357426 A1* | 11/2020 | Trella | G06F 21/554 |
| 2021/0356387 A1* | 11/2021 | Temerowski, II | H04R 5/04 |

* cited by examiner

SYSTEMS AND METHODS FOR PREVENTING LIGHTBEAM ACCESS TO MICROPHONES OF SMART DEVICES

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Smart devices (e.g., voice-controllable systems, smartphones, tablets, smart home speakers, smart home devices, smart vehicles, or any other object with an incorporated computer) may use microphones to receive audio instructions from users. A microphone may include a diaphragm (e.g., a thin membrane) that flexes in response to receiving an acoustic wave. The diaphragm and a fixed back plate located within the smart device work as a parallel-plate capacitor that changes capacitance as the diaphragm deforms in response to different sound pressures. Projecting an amplitude-modulated light beam via a laser onto the microphone may also cause movement of the diaphragm. Varying the amplitude of the light beam may cause different degrees of movement of the diaphragm, thereby causing the microphone to interpret the different degrees of movement of the diaphragm as different electrical signals. Thus, it is now recognized that the ability to access and control a microphone of a smart device via a laser projection may result in deepfake attempts, data privacy issues, security infringement, and other unauthorized access or hacking concerns.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a smart home system may comprise a microphone configured to detect an audio signal; a sensor configured to sense a light signal; one or more processors; and one or more memory devices. The one or more processors may initiate a command based on an indication, from the microphone, of detection of a particular audio signal; and in response to receiving a second indication of the light signal from the sensor, inhibit an action based on the command by disrupting the light signal, ignoring the command, or both.

In an embodiment, a method for preventing a light signal with an embedded audio command from accessing a microphone of a smart device. In accordance with this method, one or more sensors may detect a light signal with an embedded audio command. A controller may determine a frequency of the light signal. The controller may disrupt the light signal by instructing a jammer to transmit a counter light signal having the frequency to interfere with the light signal such that activation of a smart device to perform an action based on an indication from a microphone of the smart device is inhibited, or controlled.

In an embodiment, a smart device may comprise a microphone configured to receive an audio command and a controller. The controller may be configured to receive an indication of a light signal embedded with the audio command from one or more sensors; determine a frequency of the light signal in response to receiving the indication of the light signal; block the audio command from being received at the microphone of the smart device by instructing a jammer to transmit a counter light signal having the frequency to interfere with the light signal; determine a direction of a likely source of the light signal; and instruct a camera system to capture visual or audio data associated with the likely source.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
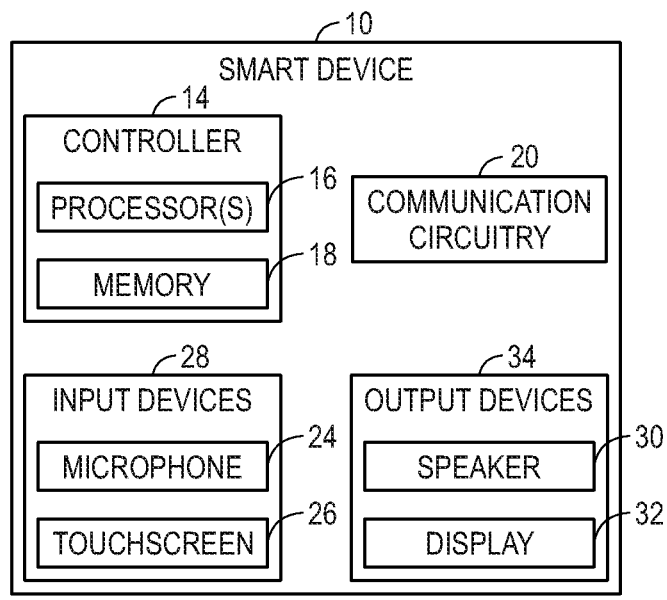
FIG. 1 illustrates a block diagram of a smart device, in accordance with an embodiment of the present disclosure.

The present disclosure relates generally to smart device security. More particularly, the present disclosure relates to systems and methods for preventing laser access to microphones of smart devices.

One or more specific embodiments of the present disclosure are described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein prevent laser access to microphones (or other sound sensitive components) of smart devices. As defined herein, a smart device may include voice-controllable systems, smartphones, tablets, smart home speakers, smart home devices, smart vehicles, and so forth. Devices such as sensors, camera systems, laser jammers, and other appliances may be communicatively coupled (wirelessly or tethered) to the smart device to facilitate detecting a laser beam and/or blocking laser access to a microphone of the device. Such devices, along with the smart device, may be a part of an Internet of Things (IoT) network to be remotely monitored, controlled, and/or accessed and provide services or notifications related to laser activity to a user of the smart device. The user may operate or be authorized to access the smart device.

Smart devices (e.g., user devices) may use a microphone to receive audio instructions from one or more users. In some embodiments, the smart device may include one or more micro-electromechanical systems (MEMS) microphones. The microphone may include a diaphragm or a thin membrane that flexes or vibrates in response to receiving a signal from an acoustic or sound wave. The microphone may convert the vibrations of the diaphragm into corresponding electrical signals. In some embodiments, the smart device may include a condenser microphone that operates on the principal of capacitance or the ability to store electrical charge. With respect to the condenser microphone, the diaphragm and a fixed back plate located within the smart device work as a parallel-plate capacitor whose capacitance changes as the diaphragm deforms in response to different sound pressures. The varying capacitance may be converted to corresponding electrical signals.

Along with sound or acoustic waves, an amplitude-modulated light beam projected onto the microphone may also cause movement of the diaphragm. The light beam may be projected via any suitable type of laser (e.g., infrared laser). Varying the amplitude of the light beam may cause different degrees of movement of the diaphragm, thereby causing the microphone to interpret the different degrees of movement of the diaphragm as different electrical signals. In some embodiments, a pulse of the light beam may heat up the microphone's diaphragm, which would expand the air around it. By expanding the surrounding air, the diaphragm may create a bump in pressure just as a sound wave may. This variance in pressure of the diaphragm may be interpreted as an electrical signal.

In some embodiments, smart devices may not authenticate received voice commands or queries. Therefore, unauthorized users or hackers may take advantage of the ability to access microphones of smart devices by faking voice commands via the light beam projected from any suitable type of laser. For example, the beam of light from an infrared laser may be projected onto the microphone. Since light from an infrared laser may be invisible to the naked eye, the user may not see, thereby being unaware of laser activity.

Moreover, while smart devices may authenticate voice commands or queries (e.g., by correlating the voice command or queries with an authorized persons voice data), unauthorized users may attempt to access the microphones of the smart device via deepfake techniques. As used herein, a deepfake may include a fake image, audio, video, or other media type that imitates the look and sound of the user of the smart device in order to gain authorized access to the smart device. That is, deepfake techniques may allow unauthorized users to command or control the smart device by presenting to the smart device as the authorized user via imitation media (e.g., audio, video). Using such deepfake techniques, an unauthorized user may be able to access and control a microphone of a user's smart device. For example, the unauthorized user may be able to hack into a voice-controllable system as well as associated systems and accounts of the user (e.g., smart home systems, smart vehicle systems, financial accounts, online services). Hacking of the user's smart device via deepfake (e.g., voice command) may result in unauthorized access to the user's banking information, ability to open a garage door of the user's home, making online purchases, and so forth.

As such, it may be useful to prevent laser access to microphones of smart devices and/or notify the user of voice commands received via light beam to reduce the likelihood of data stealing, security breaching, hacking of the smart devices and associated computing devices, and so forth by unauthorized users. Indeed, combinations of certain hardware configurations (e.g., circuitry) and software configurations (e.g., algorithmic structures and/or modeled responses) may be utilized to prevent laser access to microphones of smart devices.

In one embodiment, a physical barrier may be user to cover the microphone of the smart device to prevent laser access to the microphone. Non-limiting examples of the physical barrier may include a cloth cover (a processed natural material), a foam cover (a manufactured material), and a metal cover. Such opaque covering may allow sound to pass through the barrier and access the microphone but block light (e.g., laser light) from passing through the barrier and accessing the microphone. In some embodiments, the smart device itself may be entirely covered by an opaque covering. In other embodiments, a user may mute or turn off the microphone (or utilize a "smart" feature of the device that automatically enables/disables) when the user is not near the smart device to help prevent laser access to the microphone from a distance (e.g., beyond a typical operational distance for audio-based use).

In another embodiment, a laser detector and a camera system may be used to detect laser light, notify the user about the use of a light beam to fake voice commands, and/or acquire visual and audio data (e.g., image, video, audio recording) of the laser and/or the unauthorized user. The laser detector may include one or more light sensors that may be used to receive the light, and analyze the light to produce data about the light (signal strength, direction, frequency, duration, etc.). In one example, the one or more light sensors may be placed on an edge of a window or glass door in the user's vicinity. The user's smart device may be located near the window, glass door, or other transparent surface. If a hacker or unauthorized user projects a laser light from inside or outside the user's facility or property (e.g., near the window or the glass door of the user's house), the laser light that is refracted at the transparent surface of the window or the glass door (or due to reflection off of surfaces inside the facility) may be detected by the light sensors. The light sensors may be communicatively coupled to a controller, and the data associated with the detected light may be sent to the controller.

The controller may determine a presence of laser light near the smart device based on analyzing the sensor data. In some embodiments, the controller may also detect a direction from which the laser light originates. In one embodiment, the controller may be a component of the smart device. In another embodiment, the controller may be external to the smart device (e.g., the controller located in the cloud). Further, the controller may connect the smart device to a camera system.

The controller may send a notification or alert to the smart device regarding the presence of the laser light and direction of the source. The controller may also take other protective actions such as disabling the microphone, locking the smart device, requesting authentication, disabling certain application software, and so forth. Upon receiving the notification via the smart device, the user may want to determine the source of the laser light. Thus, in one embodiment, the controller may automatically activate a camera system to capture the source and direction of the laser light. In another embodiment, the controller may activate the camera system based on receiving user input from the smart device. In some embodiments, the camera system may capture the direction of the source of the laser light from the controller. The controller may calculate the direction of the source of the laser light based on captured image or video data from the camera system. Based on identifying the source of the laser light, the controller may use the camera system to capture image or video data of the laser and/or unauthorized user projecting the laser light.

In some embodiments, in response to receiving a voice command (e.g., based on projected laser light) at the microphone 24, the controller 14 may determine whether a user of smart device 10 (e.g., user device) is within a threshold distance from the smart device 10. The threshold distance may by any suitable range (e.g., 0-25 ft, 0-50 ft, 0-100 ft) between the user and the smart device 10 that is indicative of a distance for which the microphone 24 of the smart device 10 is capable of receiving the voice command from the user. It can be appreciated that verifying the user's proximity to the microphone 24 that was activated via the voice command may decrease the likelihood that an audio signal from the microphone 24 may be a result of fake voice commands and/or the laser light 54 accessing the microphone 24. The controller 14 may use WiFi reflection (e.g., determine position of the user based on characteristics of received reflected wireless signals after emitting wireless signals towards the user via a WiFi device, heat sensors (e.g., acquire data related to body temperature to verify presence of the user), vibrational sensors (e.g., acquire vibrational data from the smart device 10 indicative of a presence of the user), and/or motion sensors (e.g., using accelerometers or gyroscopes to acquire motion data of the smart device 10 indicative of a presence of the user) to determine the whether the user is near the smart device 10.

In additional or alternative embodiments, in response to receiving the voice command (e.g., based on projected laser light), the controller 14 may verify the user is within a threshold distance of the microphone 24 or determine the distance of the user relative to the microphone 24 by discovering other electronic devices that the user may own or be authorized to use. Such electronic devices may typically be near the user's body or be carried by the user. For example, if a user's smartphone, wearable device, or any other suitable electronic device is typically near or within the threshold distance of the microphone 24 (e.g., the user's smartphone is in the same room as the smart device 10), then the likelihood of the user also being within the threshold distance from the smart device 10 may be greater compared to the other electronic device not being within the threshold distance from the smart device 10. In particular, the controller 14 may communicatively couple to the other electronic device and request a location of the other electronic device (e.g., via location determining techniques, connections to communication hubs such as routers or base stations). It can be appreciated that verifying the user's proximity to a microphone that was activated via a voice command may decrease the likelihood that the audio signal from the microphone may be a result of fake voice commands and/or laser light accessing the microphone. Upon determining the user's proximity to the smart device 10, the controller 14 may authorize the voice command received by the microphone 24. Further, the controller 14 may continue discovering other devices of the user upon receiving future audio signals from the microphone 24.

In a further embodiment, a laser jammer may prevent laser access to the microphone and notify the user of receiving a light beam faking voice commands (e.g., via deepfake techniques). The laser jammer may be mounted near the microphone of the smart device to disrupt incoming light beams from a laser. For example, after the laser jammer detect an incoming light from a laser, the laser jammer may decode the signal associated with the light. Decoding analysis may reveal the commands and information transmitted by the laser, which may be used to understand the sophistication, intent, and other attributes of the source. After decoding, the laser jammer may transmit a counter light signal to the source of the laser. This counter light signal may have the same frequency as the decoded signal. Transmitting the counter light signal that is equivalent or approximately equivalent (e.g., within a standard deviation) in frequency to the decoded signal may confuse the laser, result in a laser operational error, and prevent the laser from accessing the microphone. The laser jammer may have a transceiver with receiving and transmitting circuitry and one or more microprocessors. In some embodiments, the laser jammer may have an alert or warning system that may notify the user of an attempt to access the user's smart device via a laser. In other embodiments, the laser jammer may be communicatively coupled to a controller of the smart device. The controller may receive laser light data from the laser jammer, analyze the data, and alert the user of any attempts of laser access to the microphone of the smart device.

Turning to the figures, FIG. 1 depicts a block diagram of a smart device 10 configured to address an access attempt via a light beam, according to embodiments of the present disclosure. A user may operate or be authorized to access the smart device 10. The smart device 10 may include any suitable type of computing device, such as, without limitation, a voice-controllable system, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe the smart device 10 as a physical device, implementations are not so limited. In some examples, the smart device 10 may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The smart device 10 may include a controller 14 to execute hardware and/or software control algorithms to detect laser light, determine the source of the laser light, and/or notify the user regarding the laser light. The controller 14 may include a programmable logic controller (PLC) or other suitable control device. According to some embodiments, the controller 14 may include an analog to digital (A/D) converter, one or more microprocessors or general or special purpose computers, a non-volatile memory, memory circuits, and/or an interface board. For example, the controller 14 may include memory circuitry 18 for storing programs, control routines, and/or algorithms implemented for control of the various system components, sending a notification regarding detection of laser light to the smart device 10 of the user. The controller 14 also includes, or is associated with, input/output circuitry for receiving sensed signals from the one or more sensors, and interface circuitry for outputting control signals. Memory circuitry 18 may store set points, actual values, historic values, and so forth, for any or all such parameters. The controller 14 also may include components for operator interaction with the systems, such as display panels and/or input/output devices for checking operating parameters, inputting control signals representative of set points and desired operating parameters, checking error logs and historical operations, and so forth. The controller 14 may receive data from the one or more sensors, which will be discussed in greater detail below. The smart device 10 may also have circuitry that enables external devices to be attached like USB ports and similar connection points.

The example smart device 10 illustrated in FIG. 1 includes communication circuitry 20 that enables the smart device 10 to communicate with other computing devices via one or more network connections. For example, the smart device 10 may communicate with one or more sensors, a camera system a laser jammer, and other electronic devices. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, 5G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The smart device 10 illustrated in FIG. 1 includes a number of input devices 28 that enable the smart device 10 to receive input (e.g., commands, queries, authentication credentials) from the user and detect activity in the surrounding environment. A non-limiting list of example input devices 28 include: microphones 24, touch screens 26, light detectors (e.g., cameras), motion detection, radar, sonar, vibration detection, and biometric sensors. It should be noted that the input devices 28 may represent a single input device 28 or multiple input devices 28. In certain embodiments, the smart device 10 may include various system or device interfaces to enable the smart device 10 to exchange information with other systems or devices (e.g., home automation systems, home or vehicle security systems, vehicle diagnostic systems). The smart device 10 illustrated in FIG. 1 also includes output devices 34 to enable the smart device 10 to provide information to the user. A non-limiting list of example output devices 34 include: speakers 30, displays 32, indicator lights, vibration motors, and alarms. It should be noted that the output devices 34 may represent a single output device 34 or multiple output devices 34.

In an example embodiment, the smart device 10 may include a voice-controllable system that includes the microphone 24 as a principal input device 28 and the speaker 30 as a principal output device 34. For such embodiments, the smart device 10 may interact with the user via a spoken natural language interface. For example, the smart device 10 may remain in a low-power or idle state until it is activated by the user speaking an activation phrase. The smart device 10 may receive and process spoken natural language queries from the user and respond to the user using spoken natural language responses. In certain embodiments, the smart device 10 may receive voice commands from the user that may be processed by the smart device 10 and/or by servers of other systems and services to enable the user to, for example, access account functions, access frequently asked question information, access concierge services, or to speak with a customer service representative. In additional or alternative embodiments, the smart device 10 may listen to conversations and, using intelligent speech analytics, artificial intelligence (AI) engines, solution databases, and/or other resources of the smart device 10, provide helpful suggestions or perform other selected or automated actions including but not limited to filtering, translating, recording, sharing, and so forth.

In general, such embodiments enable a user to have an untrained, conversational interaction with the smart device 10, and the smart device 10 may seamlessly bridge communication between the user and other systems or services. As appropriate, the smart device 10 may be capable of providing the user with additional information through other output devices 34 (e.g., the speaker 30) or via a secondary device (e.g., a smart phone or computer display 32) communicatively coupled to the smart device 10.

The controller 14 may include one or more processors 16 (e.g., a microprocessor(s)) that may execute software programs to determine the presence of a laser and provide alerts or notification to a user in response to detecting a light beam from a laser. The processor(s) 16 may process instructions for execution within the smart device 10. The processor(s) 16 may include single-threaded processor(s), multi-threaded processor(s), or both. The processor(s) 16 may process instructions and/or information (e.g., control software, look up tables, configuration data) stored in memory devices 18 or on storage device(s). The processor(s) 16 may include hardware-based processor(s), each including one or more cores. Moreover, the processor(s) 16 may include multiple microprocessors, one or more "general-purpose" microprocessors, one or more system-on-chip (SoC) devices, one or more special-purpose microprocessors, one or more application specific integrated circuits (ASICS), and/or one or more reduced instruction set (RISC) processors. The processor(s) 16 may be communicatively coupled to one or more sensors and/or other electronic devices (e.g., camera system, electronic display).

The memory device 18 may include a tangible, non-transitory, machine-readable medium, such as a volatile memory (e.g., a random access memory (RAM)) and/or a nonvolatile memory (e.g., a read-only memory (ROM), flash memory, a hard drive, and/or any other suitable optical, magnetic, or solid-state storage medium). The memory device 18 may store a variety of information that may be used for various purposes. For example, the memory device 18 may store machine-readable and/or processor-executable instructions (e.g., firmware or software) for the processor 16 to execute. In particular, the memory device 18 may store instructions that cause the processor 16 to identify laser light, determine a source of the laser light, and notify the user about the laser light.

The processor(s) 16 may analyze relevant laser light information and send the relevant laser light information, data resulting from analyzing the relevant light information, an associated alert, or the like to a separate system (e.g., a separate smart device) of the user via the controller 14. The sensors, the processor(s) 16, the memory 18 are communicatively coupled to the controller 14. In some embodiments, if the controller 14 is external to the smart device 10, then the controller 14 may send the relevant laser light information, data resulting from analyzing the relevant light information, an associated alert, or the like to the smart device 10 or a connected smart device. For example, the user may access the relevant laser light information, data resulting from analyzing the relevant light information, an associated alert, or the like via his or her mobile device, computing device, smart watch, and so forth.

Figure 2:
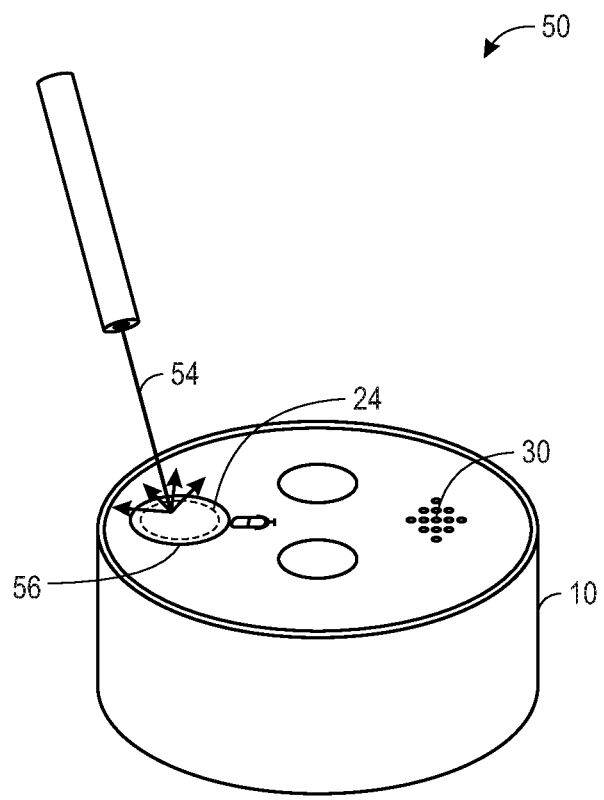
FIG. 2 illustrates a schematic diagram of a laser access prevention system having a barrier that prevents laser access to a microphone of the smart device of FIG. 1, in accordance with an embodiment of the present disclosure.

With the preceding in mind, FIG. 2 depicts a light beam or laser access prevention system 50 to prevent for example, a laser 52 emitting a laser light 54, from accessing a microphone 24 of the smart device 10 by blocking the laser light 54 using a physical barrier 56. The physical barrier 56 may be impenetrable to light. Thus, the physical barrier 56 may be used to cover the microphone 24 of the smart device 10 to block the laser light 54 from reaching the microphone 24. In some embodiments, the laser light 54 may be produced from an infrared laser, a visible laser, ultraviolet laser, and so forth. While the laser 52 and the laser light 54 are used as examples throughout the present disclosure, it should be understood that these features may represent other light beam generators and light beams, respectively.

In some embodiments, the physical barrier 56 may include an opaque material such as a cloth cover, a foam cover, a metal cover, and the like. Such opaque materials may allow sound to pass through the physical barrier 56 and access the microphone 24 but block light (e.g., the laser light 54) from passing through the physical barrier 56 and accessing the microphone 24. In some embodiments, the smart device 10 itself may be entirely covered by the physical barrier 56 (e.g. an opaque covering). In additional or alternative embodiments, the smart device 10 may mute or turn off the microphone 24 when the user is not near the smart device 10 to help prevent the laser 52 from accessing the microphone 24. For example, a camera or other light detector may be used to detect motion and limit operation of the microphone 24 when no motion has been detected within a range (e.g., a specified distance) and timeframe. In one embodiment, the smart device 10 may be capable of detecting user activity based on the microphone 24 picking up sounds resulting from user activity (e.g., walking or breathing) within a certain range. If such user activity is not detected, the smart device 10 may block responses to instructive input (e.g., audio instructions to perform an operation). Further, the smart device 10 may include other input devices 28 (e.g., a camera) that detects the presence of a user within a certain range and controls whether instructive input will be processed or not. By limiting responses to instructive input when a user is not detected in a designated vicinity, the smart device 10 may eliminate remote attacks via light beams (e.g., an unauthorized use attempt from outside of a window or from a distance beyond what would be considered normal for audio-based use).

As mentioned above, covering the microphone with the physical barrier 56 may prevent unauthorized users or hackers from taking advantage of the ability to fake voice commands via the laser light 54 to access the microphone 24 of the smart device 10 as well as associated systems and accessories (e.g., the speaker 30 that is associated with the smart device 10).

Figure 3:
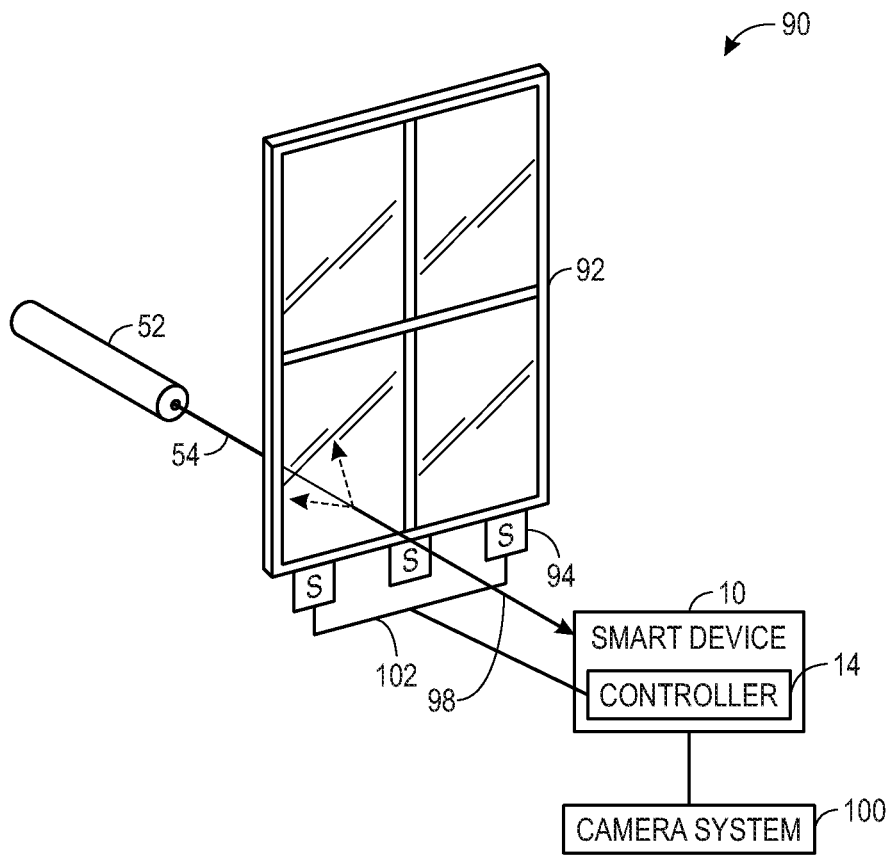
FIG. 3 depicts a schematic and block diagram of a laser detector and a camera system that may include the smart device of FIG. 1, in accordance with an embodiment of the present disclosure.

FIG. 3 depicts a schematic and block diagram of a laser detector and camera system 90, in accordance with an embodiment of the present disclosure. The system 90 may include a laser detector 102 and a camera system 100 that may detect the laser light 54, notify the user about voice commands faked via the laser light 54, and acquire visual and audio data (e.g., image, video, audio recording) of the laser 52 and/or the unauthorized user associated with the laser light 54. In some embodiments, the laser detector 102 may be communicatively coupled to the camera system 100 via the controller 14. In other embodiments, the camera system 100 may be a component of the laser detector 102.

In general, the laser detector 102 may capture sensor information related to light via one or more sensors 94. The sensors 94 may include any number or type of sensors for detecting light, including light dependent resistors (LDRs), photodiodes, phototransistors, light-emitting diodes (LEDs), infrared sensors, and/or light sensors. The sensors 94 may be communicatively coupled to the controller 14. In one embodiment, the controller 14 may be a component of the smart device 10. In another embodiment, the controller 14 may be external to the smart device 10 (e.g., the controller 14 may be cloud-based).

In one example, the laser detector 102 and corresponding sensors 94 may be placed on one or more edges of a window 92 or glass door of a property (e.g., the user's house, a rented office, employer office, a local café that shares use of the laser detector). The user's smart device 10 may be located near the window 92, glass door, or a transparent surface. If a hacker or unauthorized user projects a laser light 54 from outside (or potentially from a device placed inside) the property or facility toward the smart device 10 (through the window 92), at least some of the laser light may be refracted in the window 92 (e.g., between surfaces of the window 92). The sensors 94 of the laser detector 102 may detect the refracted laser light 98. That is, when passing through the window 92, a portion of the laser light 98 may be refracted while another portion of the laser light 98 may be reflected. In some instances, the laser detector 102 may detect the portion of light refracted as well as the portion of light reflected. Based on material composition the window 92, level of transparency of the window 92, angles of incidence (e.g., angle between ray(s) of laser light 98 and respective refracted ray(s), angle between the ray(s) of laser light 98 and respective reflected ray(s)), and/or vector properties of the refracted ray(s) and the reflected ray(s), the laser detector 102 may determine a likely source of the laser light 98 and/or a direction of position of the likely source with respect to the window 92. In some embodiments, the laser light may determine patterns from the captured refracted light, reflected light, and/or both. In some embodiments, based on such light patterns (e.g., correlation between measured angles of incidence and measured illuminance of a surface of the laser detector based on the rays(s) of refracted light) additional contextual information, the laser detector 102 may determine a likely source of the laser light 98 and/or a direction of position of the likely source with respect to the sensors 94. In alternative embodiments, the sensors 94 may be coupled to the smart device 10 or disposed within the smart device 10. The smart device 10 may include transparent materials to facilitate the detection of the laser light 98 that passed through the window 92 via the sensors 94.

Figure 4:
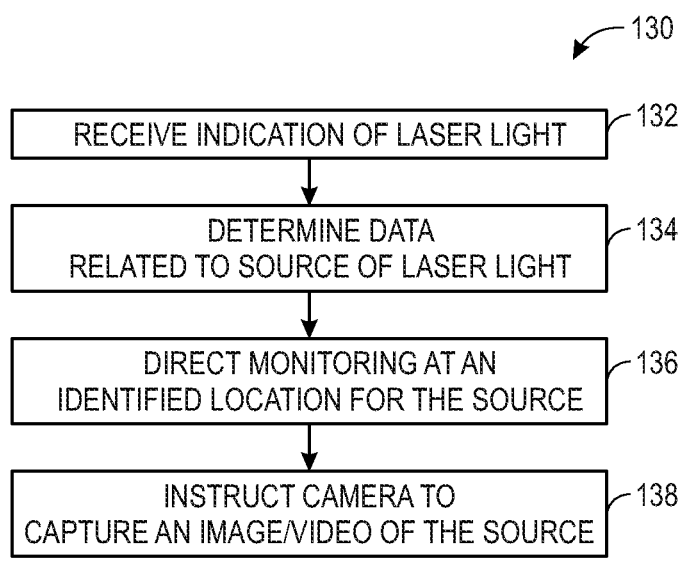
FIG. 4 depicts a flow chart of a process for capturing a source of laser light via the laser detector and the camera system of FIG. 3, in accordance with an embodiment of the present disclosure.

As shown in FIG. 4, the sensors 94 may send data related to the laser light 98 to the controller 14. FIG. 4 depicts a process 130 for operating the laser detector 102 and the camera system 90. The process 130 may be performed by any suitable device that may control components of the laser detector 102 and the camera system 90 of FIG. 3, such as the smart device 10, the controller 14, the processor 16, and/or the camera system 100. While the process 130 is described using steps in a specific sequence, it should be understood that the present disclosure contemplates that the described steps may be performed in different sequences than the sequence illustrated, and certain described steps may be skipped or not performed altogether. In some embodiments, the process 130 may be implemented by executing instructions stored in a tangible, non-transitory, computer-readable medium, such as the memory 18, using a processor, such as the processor 16.

With respect to FIG. 4, the controller 14 receives an indication of the presence of the laser light 54 from the laser detector 102 and/or corresponding sensors 94 (block 132). For example, after receiving laser light data from the laser detector 102 and/or corresponding sensors 94, the controller 14 may verify a presence of laser light 54 near the smart device 10 based on analyzing frequency and other parameters related to the laser light 54 that passes through a window or transparent surface from the laser detector 102 and corresponding sensors 94.

In some instances, the controller 14 may instruct the smart device 10 or an external device communicatively coupled to the smart device 10 to emit vapor, fog, smoke, haze, or any reflective medium in response to receiving the voice command via a microphone based on the laser light 54. For example, if the controller 14 determines that the user is not near the smart device 10 but receives a voice command via the microphone 24, the controller 14 may instruct the smart device 10 or other external devices coupled to the smart device 10 to emit vapor, fog, smoke, haze, or any reflective medium. The reflective medium may cause any incoming laser light 54 aimed at the microphone 24 to attenuate and/or become visible. In additional or alternative embodiments, the controller 14 may determine the presence of the laser light 54 using the camera system 100 to capture image data of the visible laser light 54. The controller 14 may also determine the presence of the laser light in response to receiving an indication that the incoming laser light 54 has been attenuated or become visible via the smart device 10 or the external devices couples to the smart device 10.

In addition to determining the presence of the laser light 54, the controller 14 also determines a direction from which the laser light 54 originates based on receiving data from location sensors associated with the laser detector 102 (block 134). Using data indicative of the direction from which the laser light 54 is directed, present embodiments may calculate a likely positioning of a source (the laser 52) of the laser light 54. For example, the controller 14 may determine the likely positioning of the source based on a known or predetermined position of the window 92. That is, if the laser light 54 is received via the window by the sensors 94, the controller 14 may determine that the direction from which the laser light 54 is directed is from the smart device 10 to the window 92. The controller 14 may further determine information related to the source of the laser light 54 by directing monitoring (block 136) based on the identified source location (e.g., a likely position of the source based on observed data). Such monitoring (e.g., checking for Bluetooth signals) may result in identifying any electronic devices (e.g., a smartphone) that may be near or associated with the laser 52. The electronic device detected in this manner may also be associated with the unauthorized user. That is, identifying information for a smart device may be discovered near a location that has been identified as including or likely including the laser 52 and this information may lead to identifying information associated with the unauthorized user. Geographical locations of electronics associated with the hacker may be captured by location sensor(s), transceiver(s), and/or other software or hardware component(s) communicatively coupled to the controller 14 that determine the location using one or more of the following: an inertial navigation system, a dead-reckoning navigation system, a network positioning system, a radio position finding system, a satellite-based navigation system (e.g., Global Positioning System (GPS) receiver, a Global Navigation Satellite System (GLONASS) receiver, a Galileo receiver, an Indian Regional Navigational Satellite (IRNS) System receiver), an accelerometer system, a gyroscope system, and so forth. In some embodiments, the location may also be determined through geolocation based on an internet protocol (IP) address of the hacker's electronic device.

Additionally or alternatively, the controller 14 may connect the smart device 10 to the camera system 100. In some embodiments, the camera system 100 may also perform a light detection and ranging (LiDAR) operation. Upon determining the presence of the laser light 54, the controller 14 may send a notification or alert to the smart device 10 regarding the presence of the laser light 54 and direction (e.g., likely direction) of the source (e.g., the laser 52 and/or an unauthorized user). In other embodiments, the controller 14 may send the notification via an electronic display of other user devices (e.g., smartphone, wearable device) coupled to the smart device 10. For example, the controller 14 may send the notification as an email, SMS text message, and/or via a software application installed on the smart device 10 and the other user devices. Furthermore, the notification may include a visual alert, an audio alert, a vibrational alert, and the like.

After receiving the notification, in one embodiment, the controller 14 may automatically activate the camera system 100 to capture the source of the laser light 54 by directing the camera system 100 to the likely source of the laser light 54 (block 136). In some embodiments, the controller 14 may determine the likely positioning of the source based on a known or predetermined position of the window 92. That is, if the laser light 54 is received via the window by the sensors 94, the controller 14 may determine that the direction from which the laser light 54 is directed is from the smart device 10 to the window 92. In another embodiment, the controller 14 may activate the camera system 100 based on receiving user input from the smart device 10. After directing the camera system 100 to the likely source of the laser light 54, the controller 14 instructs the camera system 100 to capture image and/or video data of the source of the laser light 54 (block 138). The image and/or video data may include imagery or video captured from one or more cameras (e.g., a front camera, a rear camera, a side camera, or any other camera) within or mounted to a smart home or from a camera of the electronic devices. In some embodiments, audio recording may also be captured via the camera system 100. The controller 14 may use the captured visual and/or audio data to detect the laser 52 and/or the associated hacker responsible for projecting the laser light 54. In some cases, the controller 14 may upload the captured visual and/or audio data to the cloud, to a security monitoring service, to a law enforcement agency, to a financial institution web service, and the like, to report a possible fraud occurrence.

In further embodiments, the controller 14 may block or disrupt the incoming laser light 54 such that the laser light 54 cannot access the microphone 24. In some embodiments, if the laser light 54 accesses the microphone 24 via a light signal, the controller 14 may disrupt an audio command embedded in the light signal received by the microphone 24. In general, the controller 14 may authenticate audio or voice commands corresponding to a signal received by the microphone 24. For example, if the controller 14 determines that the audio or voice command includes authorized word, phrases, or sound characteristics, then the controller 14 may perform an instruction associated with the audio or voice command. However, if the controller 14 determines that an audio command is embedded in the detected laser light 54, the controller 14 may disrupt the embedded audio command, such that the instruction associated with the embedded audio command cannot be performed or be ignored. In some embodiments, in response to receiving an indication of the light signal and an indication of the audio command (e.g., from one or more light sensors and the microphone 24 simultaneously or at approximately the same time), the controller 14 may prevent the audio command from being received by disrupting the light signal and/or ignoring the audio command.

The embedded audio command may be defined as an audio command corresponding to perceived sound characteristics that originate from light characteristics (e.g., the laser light 54). Further, as used herein, the embedded audio command may be based on fake voice commands. It should be noted that reference to an audio command being embedded in a light signal includes a light signal with characteristics that operate to induce a microphone to perceive the light signal as audio waves that correlate to a particular instruction or command. For example, a microphone for a smart device may initiate a phone call based on a perceived audio command that is not actually provided via audio but as the result of compression/contraction of air proximate the microphone and caused by the light signal.

Figure 5:
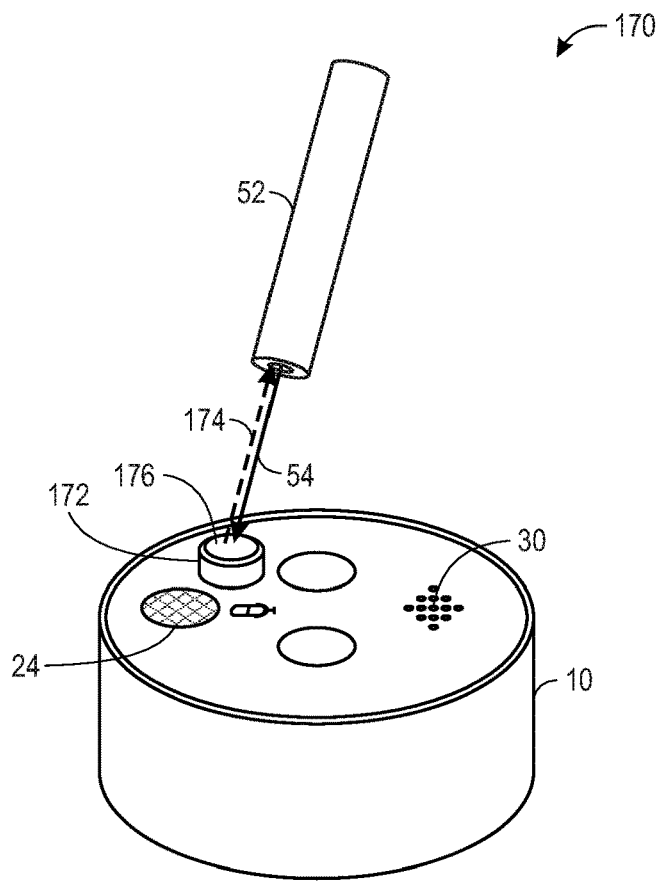
FIG. 5 illustrates a schematic diagram of a laser jamming system having a laser jammer that prevents laser access to the microphone of the smart device of FIG. 1, in accordance with an embodiment of the present disclosure.

Turning to FIG. 5, a schematic diagram of a laser jamming system 170 is illustrated, in accordance with an embodiment of the present disclosure. Along with the smart device 10, the system 170 may include a laser jammer 172 to prevent, disrupt, or garble the laser 52 from accessing the microphone 24 and to notify the user of a voice command faked via the laser light 54. In some embodiments, the laser jammer 172 may be mounted near the microphone 24 of the smart device 10 to disrupt the incoming laser light 54 from the laser 52. For example, the laser jammer 172 may detect the laser light 54 from the laser 52 via one or more sensors 176. The laser jammer 172 may capture sensor information related to light via one or more sensors. The sensors 176 may include any number or type of sensors, including light dependent resistors (LDRs), photodiodes, phototransistors, light-emitting diodes (LEDs), infrared sensors, and/or light sensors. The sensors may be communicatively coupled to the controller 14. In some embodiments, the sensors 176 may disposed within the smart device 10 rather than within the laser jammer 172. As such, the smart device 10 may include transparent materials to detect the laser light 54. After capturing the laser light 54, the smart device 10 may be communicatively coupled with the laser jammer 172 and may instruct the laser jammer 172 to disrupt the laser light 54 via the controller 14.

Figure 6:
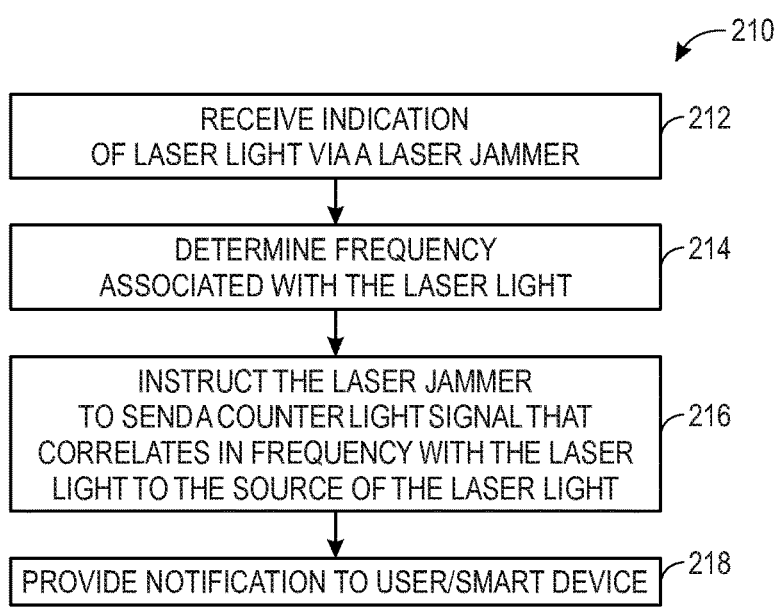
FIG. 6 depicts a flow chart of a process for blocking a laser light via the laser jamming system of FIG. 5, in accordance with an embodiment of the present disclosure.

With FIG. 5 in mind, FIG. 6 depicts a process 210 associated with preventing laser access to the microphone 24 via the laser jamming system 120, in accordance with an embodiment of the present disclosure. The process 210 may be performed by any suitable device that may control components of the laser jamming system 120 of FIG. 5, such as the smart device 10, the controller 14, the processor 16, and/or the laser jammer 172. While the process 210 is described using steps in a specific sequence, it should be understood that the present disclosure contemplates that the described steps may be performed in different sequences than the sequence illustrated, and certain described steps may be skipped or not performed altogether. In some embodiments, the process 210 may be implemented by executing instructions stored in a tangible, non-transitory, computer-readable medium, such as the memory 18, using a processor, such as the processor 16.

According to FIG. 6, the controller 14 receives an indication of the laser light 54 via the laser jammer 172 (block 212). For example, the laser jammer may include one or more sensors that may detect light. As mentioned above, the sensors 176 may include any number or type of sensors, including light dependent resistors (LDRs), photodiodes, phototransistors, light-emitting diodes (LEDs), infrared sensors, and light sensors. The sensors 176 may be communicatively coupled to the controller 14. The controller 14 decodes a light signal projected from the laser 52 and determines a frequency associated with the laser light 54 after receiving an indication of the presence of the laser light 54 from the laser jammer 172 (block 214). In other embodiments, in response to detecting the laser light 54, the laser jammer 172, itself, may decode a light signal, determine a frequency associated with the laser light 54, and send decoded data to the controller 14.

After decoding the light signal and determining the frequency associated with the laser light 54, the controller 14 instructs the laser jammer 172 to transmit a counter light signal 174 to the likely source of the laser light 54 (block 216). This transmitted counter light signal 134 may have the same or approximate frequency as the decoded light signal corresponding to the detected laser light 54. Transmitting counter light signal 134 that is equivalent in frequency to the decoded light signal corresponding to the laser light 54 may confuse the laser 52, result in a laser operational error, and prevent the laser 52 from accessing the microphone 24. For example, the counter light signal 134 may disrupt or interfere with the laser light 54. As such, the laser light 54 may be partially or completely blocked from accessing the microphone 24.

However, in some embodiments, if the laser light 54 accesses the microphone 24 via a light signal, the controller 14 may disrupt an audio command embedded in the light signal received by the microphone 24. In general, the controller 14 may authenticate audio or voice commands corresponding to a signal received by the microphone 24. For example, if the controller 14 determines that the audio or voice command includes authorized word, phrases, or sound characteristics, then the controller 14 may perform an instruction associated with the audio or voice command. However, if the controller 14 determines that an audio command is embedded in the detected laser light 54, the controller 14 may disrupt the embedded audio command, such that the instruction associated with the embedded audio command cannot be performed or be ignored. In some embodiments, in response to receiving an indication of the light signal and an indication of the audio command (e.g., from one or more light sensors and the microphone 24 simultaneously or at approximately the same time), the controller 14 may prevent the audio command from being received by disrupting the light signal and/or ignoring the audio command. The embedded audio command may be defined as an audio command corresponding to perceived sound characteristics that originate from light characteristics (e.g., the laser light 54). Further, as used herein, the perceived audio command may be based on fake voice commands.

In some embodiments, the laser jamming system 120 may also include an alert or warning system that may notify the user of an attempt to access the user's smart device 10 via the laser 52. In additional or alternative embodiments, the laser jammer 172 may be communicatively coupled to the controller 14 of the smart device 10. Thus, the controller 14 receives laser light data from the laser jammer 172, analyzes the data, and alerts the user of fake voice commands used to access the microphone 24 of the smart device 10 via the laser 52 (block 218).

In some embodiments, the user may receive a notification via the display 32 (e.g., a GUI) of the smart device 10. In other embodiments, the user may receive the notification via an electronic display of other user devices (e.g., smartphone, wearable device) coupled to the smart device 10. For example, the controller 14 may send the notification as an email, SMS text message, and/or via a software application installed on the smart device 10 and the other user devices. Furthermore, the notification may include a visual alert, an audio alert, a vibrational alert, and the like.

The display 32 may include a warning related to projecting fake voice commands via the laser light 54 and information related to the source of the laser light 54. In some embodiments, the user may be able to interact with a virtual or smart agent via voice or text queries. The virtual or smart agent may provide details to the user on how to address the fake voice commands via the laser light 54 used to access the microphone 24 by an unauthorized user. In some embodiments, the notification to the user and corresponding smart device 10 may be sent in or near real-time after detecting the use of fake voice commands via the laser light 54 or deepfake. In additional or alternative embodiments, the laser access prevention system 50, the laser detector 102, the camera system 90, and/or the laser jamming system 170 may be retrofitted or mounted onto existing smart devices (e.g., the smart device 10) via an adaptive mechanism. As such, these devices may be manufactured and/or sold by a different party than the smart device 10, and be added to the smart device 10.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While only certain features of the disclosure have been illustrated and described herein, many modifications and changes will occur to those skilled in the art. It is, therefore, to be understood that the appended claims are intended to cover all such modifications and changes as fall within the true spirit of the invention.

The invention claimed is:

1. A smart home system comprising:
   a microphone configured to detect an audio signal;
   a sensor configured sense a light signal;
   one or more processors; and
   one or more memory devices configured to store machine-readable instructions that, when executed by the one or more processors, cause the one or more processors to:
   initiate a command based on an indication, from the microphone, of detection of a particular audio signal; and
   detect refraction of the light signal via a transparent material and determine an orientation relative to a source of the light signal based on the refraction;
   in response to receiving a second indication of the light signal from the sensor, inhibit an action based on the command by disrupting the light signal, ignoring the command, or both.

2. The smart home system of claim 1, wherein the sensor is configured to detect the light signal based on characteristics of the light signal corresponding to characteristics of the particular audio signal.

3. The smart home system of claim 2, wherein the machine-readable instructions, when executed by the one or more processors, cause the one or more processors to determine that the particular audio signal is not authentic in response to determining that the command associated with the particular audio signal is not authorized by a user of the smart home system.

4. The smart home system of claim 1, wherein the machine-readable instructions, when executed by the one or more processors, cause the one or more processors to determine a direction of a likely source of the light signal in response to receiving the second indication of the light signal from the sensor.

5. The smart home system of claim 4, wherein the machine-readable instructions, when executed by the one or more processors, cause the one or more processors to direct a camera system in the direction of the likely source.

6. The smart home system of claim 5, wherein the machine-readable instructions, when executed by the one or more processors, cause the one or more processors to activate the camera system based on receiving a user input.

7. The smart home system of claim 1, wherein the machine-readable instructions, when executed by the one or more processors, cause the one or more processors to send a notification to a user device in response to receiving the indication of the light signal from the sensor.

8. The smart home system of claim 1, wherein the sensor is disposed within a smart device.

9. A method, comprising:
- detecting, via one or more sensors configured to couple to glass, a light signal embedded with an audio command;
- determining, via a controller, a frequency of the light signal; and
- disrupting, via the controller, the light signal by instructing a jammer to transmit a counter light signal having the frequency to interfere with the light signal such that activation of a smart device to perform an action based on an indication from a microphone of the smart device is inhibited.

10. The method of claim 9, wherein the one or more sensors comprise one or more light dependent resistors (LDRs), one or more photodiodes, one or more phototransistors, one or more light-emitting diodes (LEDs), one or more infrared sensors, one or more light sensors, or any combination thereof.

11. The method of claim 9, comprising determining a direction of a likely source of the light signal.

12. The method of claim 9, comprising sending, via the controller, a notification to the smart device in response to detecting the light signal.

13. The method of claim 9, wherein the smart device comprises a smartphone, a tablet, a smart speaker, a smart home device, or any combination thereof.

14. The method of claim 9, comprising determining refracted light from the glass, wherein the refracted light comprises the light signal.

15. The method of claim 14, comprising determining a direction of a likely source of the light signal based on the refracted light.

16. A smart device, comprising:
- a microphone configured to receive an audio command; and
- a controller configured to:
    - receive an indication of a light signal embedded with the audio command from one or more sensors;
    - determine a frequency of the light signal in response to receiving the indication of the light signal;
    - block the audio command from being received at the microphone of the smart device by instructing a jammer to transmit a counter light signal having the frequency to interfere with the light signal;
    - determine a direction of a likely source of the light signal; and
    - instruct a camera system to capture visual or audio data associated with the likely source.

17. The smart device of claim 16, wherein the controller is configured to send a notification to a user device in response to receiving the indication of the light signal.

18. The smart device of claim 17, wherein the notification comprises the visual or audio data associated with the likely source.

19. The smart device of claim 16, wherein the controller is configured to instruct the camera system to capture the visual or audio data associated with the likely source based on receiving a user input.

20. The smart device of claim 16, wherein the one or more sensors are disposed within the jammer.

* * * * *